Figure 5:
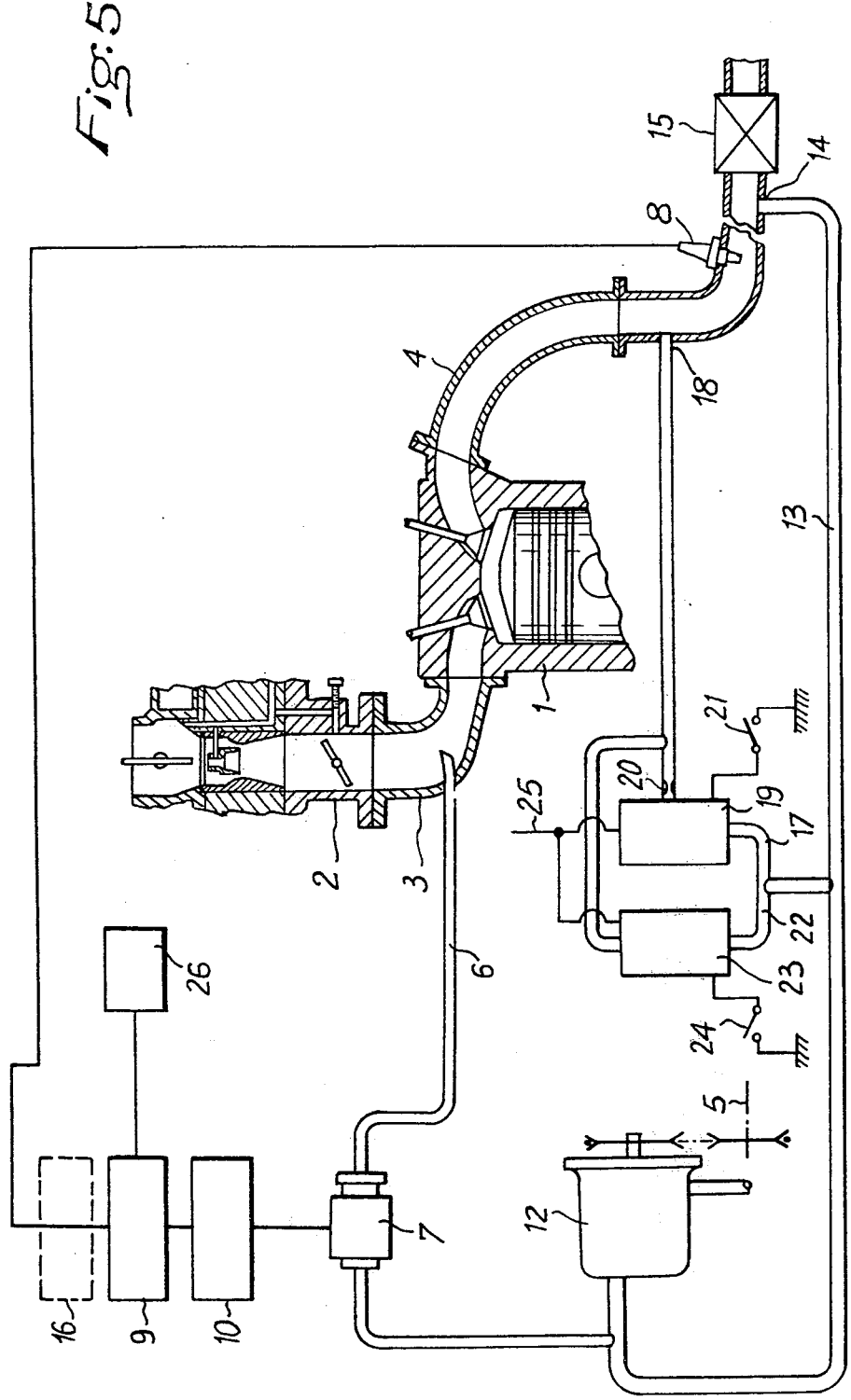

United States Patent [19]

Laprade et al.

[11] 4,007,718
[45] Feb. 15, 1977

[54] DEVICE FOR CORRECTING THE AIR/PETROL RATIO FOR AN INTERNAL COMBUSTION ENGINE

[76] Inventors: Bernard R. Laprade; Xavier J. Laprade, both of 64 - Arudy; Pierre J. Gele, Route de Lourdes, 65 - Odos Tarbes, all of France

[22] Filed: July 17, 1973

[21] Appl. No.: 380,109

[30] Foreign Application Priority Data

Aug. 2, 1972 France .............................. 72.27792

[52] U.S. Cl. .............................. 123/119 D; 60/276; 60/285; 123/26; 123/32 EA; 123/119 E; 123/124 B

[51] Int. Cl.² .................. F02M 25/06; F01N 3/00; F02B 75/10

[58] Field of Search ....... 123/119 D, 124 R, 124 B, 123/32 EA, 119 E, 26; 60/276, 285

[56] References Cited
UNITED STATES PATENTS

| | | | |
|---|---|---|---|
| 3,641,767 | 2/1972 | Krans et al. ................... | 123/119 D |
| 3,738,341 | 6/1973 | Loos ................................ | 60/276 |
| 3,745,768 | 7/1973 | Zechnall et al. ..................... | 60/276 |
| 3,759,232 | 9/1973 | Wahl et al. ..................... | 123/119 D |
| 3,799,301 | 3/1974 | Bentley .......................... | 123/124 R |
| 3,827,237 | 8/1974 | Linder et al. .................... | 60/276 X |
| 3,831,564 | 8/1974 | Schmidt et al. ................. | 123/119 R |

Primary Examiner—Charles J. Myhre
Assistant Examiner—Sheldon Richter
Attorney, Agent, or Firm—Finnegan, Henderson, Farabow & Garrett

[57] ABSTRACT

A device for correcting the proportioning of the air/petrol mixture furnished by a proportioning means to an internal combustion engine comprising a probe producing a signal which is a function of the oxygen or carbon monoxide content of engine exhaust gas and an auxiliary air admission valve downstream of the air/petrol proportioning means, this valve being periodically operable by control means sensitive to said signal.

7 Claims, 5 Drawing Figures

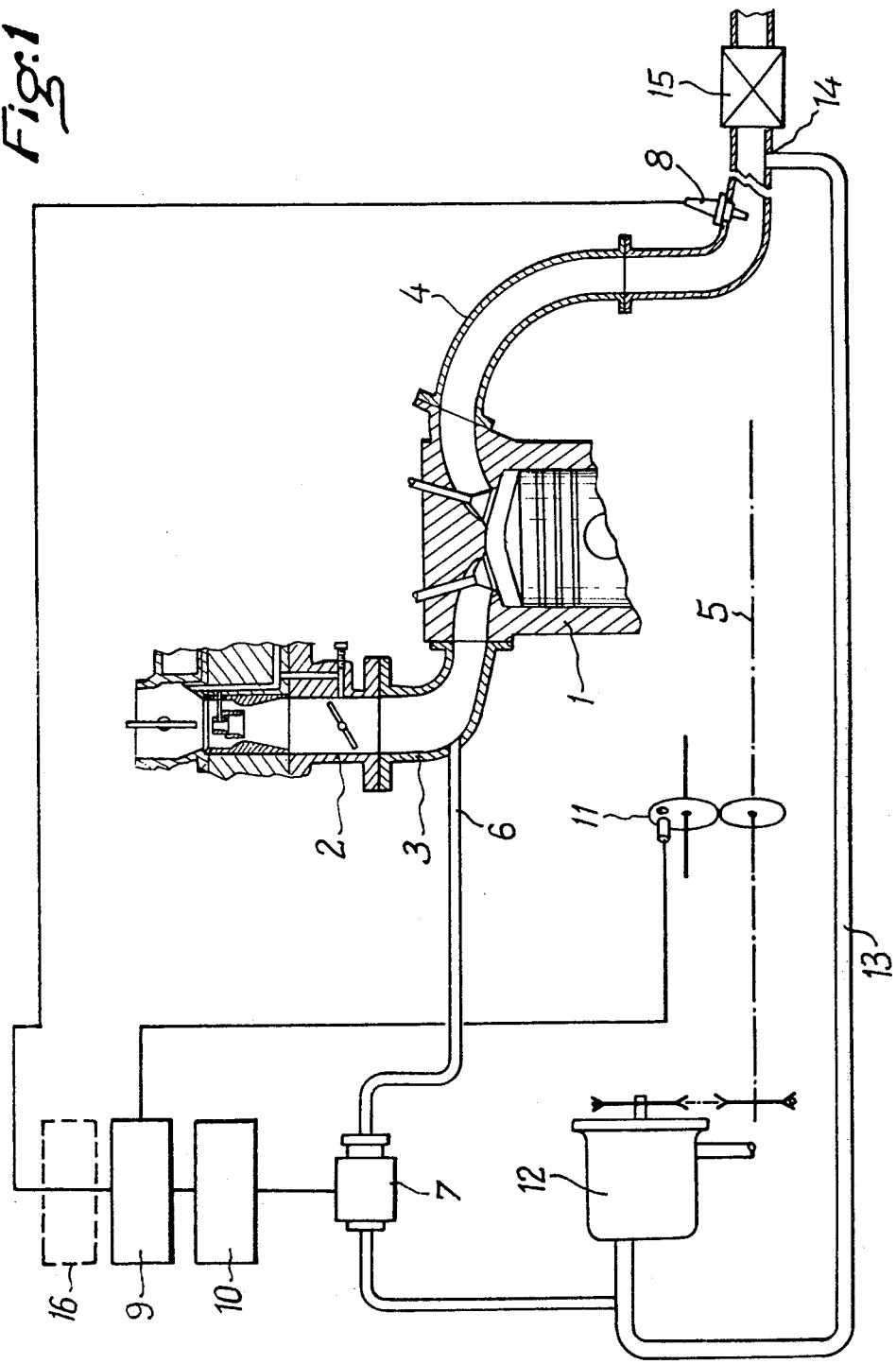

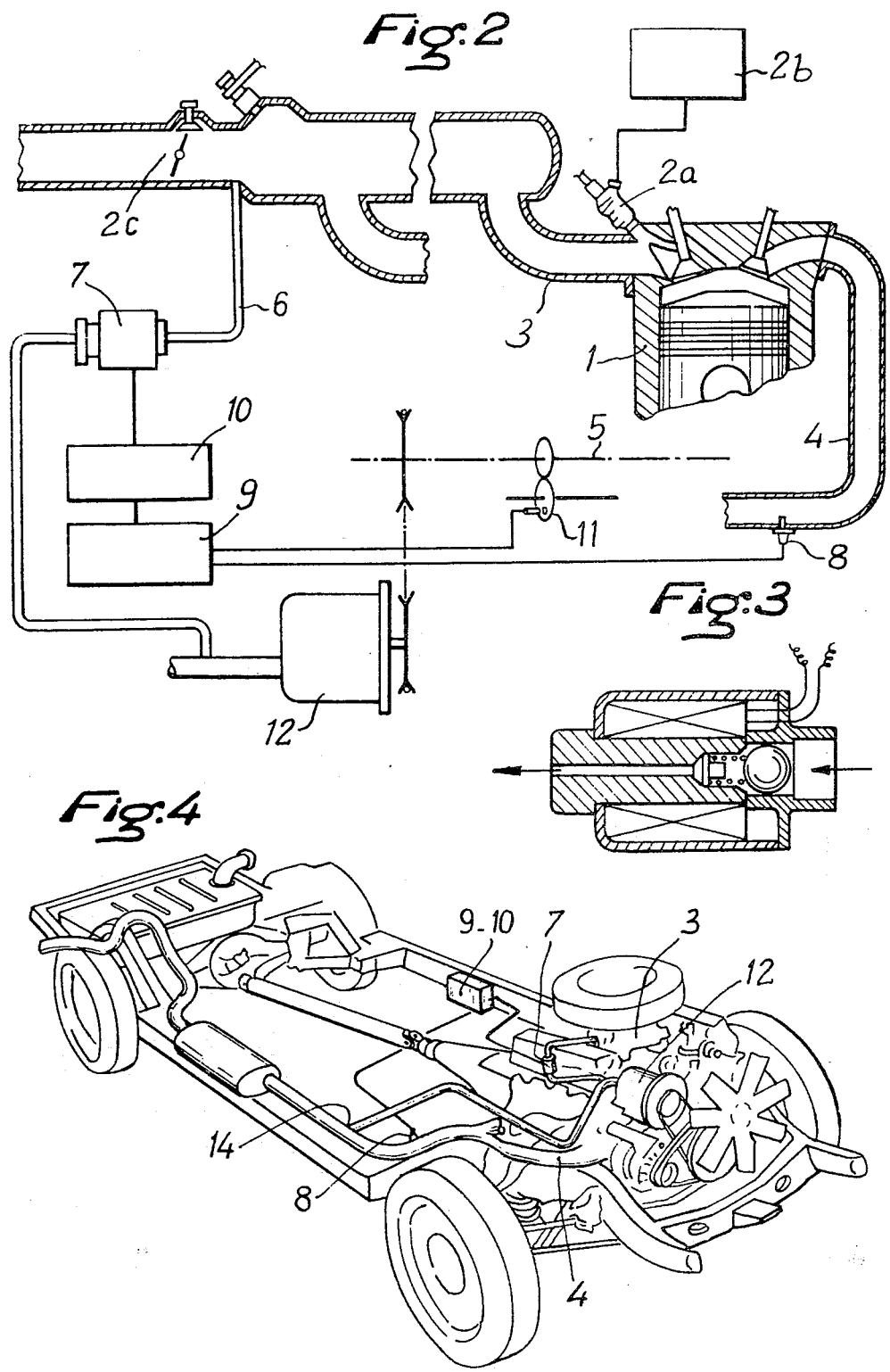

DEVICE FOR CORRECTING THE AIR/PETROL RATIO FOR AN INTERNAL COMBUSTION ENGINE

When the relative proportioning of air and petrol in an internal combustion engine is not correctly effected (stoichiometric proportioning) and particularly if the mixture is too rich in petrol the exhaust gases contain high proportions of CO and unburnt components.

In order to reduce to a minimum the resultant pollution from such an engine it is therefore necessary amongst other conditions to arrive at strict proportioning of the mixture.

Now, an internal combustion engine generally operates at speeds and loads which vary in very large proportions, which makes constantly correct proportioning particularly difficult, and in general with the best adjusted carburettors the result obtained is an oscillation of the proportioning about the optimum value, the mixture being now a little too rich, now a little too poor depending on the running conditions (speed and load) and the exhaust gases hence containing now an excess of CO, now residual oxygen.

In order to cure these disadvantages numerous solutions have been proposed, some attempting to improve the adjustments of the carburettors or injection devices, others attempting to inject air into the exhaust piping in order to effect post-combustion of the unburnt components, with or without the aid of catalysts.

It has likewise been proposed to subject the air-petrol mixture proportioning member or members to the composition of the burnt gases measured by a suitable prope. One is thus lead to air-petrol mixture proportioning members into which a supplementary parameter is introduced either onto the petrol feed or onto the air admission. This solution provides no cure of the defects of the apparatus already in circulation.

The object of the invention is to provide a corrective device adaptable to existing engines without replacement or modification of their members being necessary.

According to the present invention there is provided a device for correcting the proportioning of the air-petrol mixture furnished by a proportioning member to an internal combustion engine having an intake pipe connected from the proportioning member and an exhaust pipe for burnt gases, the device comprising at least one auxiliary air inlet tapped into the intake pipe downstream of the member determining the proportioning of the air-petrol mixture, at least one valve controlling the said air inlet or inlets, a probe arranged in the exhaust pipe for delivering an electric signal which is a function of the composition of the burnt gases and electronic means releasing electrical pulses controlling the opening of the valve or valves in synchronism with the engines so as to introduce into the mixture a quantity of air predetermined at each cycle of the engine in response to the information from the probe when the concentration of oxygen in the burnt gases is lower than a predetermined value (or the concentration of CO is higher than a predetermined value).

The mixture is thus weakened and its proportioning is corrected by a predetermined amount selected as the basis of regulation.

By the expression "petrol and air proportioning member" is to be understood a device such as a carburettor or injecting system.

The expressing "member determining the porportioning of the petrol and air" designates either the members of the carburettor which determine the flows of air and petrol or the air flow measuring device of an injection system; in accordance with the invention it is in fact necessary but sufficient that the additional air inlet enters downstream of the members which affect the initial proportioning.

The probe will, for example, consist of a zirconium oxide ($ZrO_2$) base pellet one face of which is in contact with the burnt gases, the other face being in contact with the atmosphere, and which has the property of delivering a voltage variable as a function of the difference in the partial pressures of oxygen across the two faces of the pellet.

Such a probe detects the disappearance of the presence of oxygen in the burnt gases, a disappearance which corresponds with stoichiometry of the mixture introduced in the carburettor. The voltage furnished by the probe therefore varies abruptly between a few millivolts and about 1000 millivolts, to remain subsequently approximately stationary whilst the content of CO in the burnt gases increases.

The electronic means combined with the probe will be a threshold circuit comparing the voltage furnished by the probe with a threshold voltage and delivering a signal when the voltage from the probe is higher than the threshold, the said signal controlling the opening of the valve by means if necessary of an amplifier circuit.

If necessary an integrator could be interposed between the probe and the threshold circuit in order to give a mean value of the voltage of the probe.

Synchronization of the value with the engine can be obtained by means of a proximity pick-up triggered by the passing of a metallic part carried by a disc rotated by the engine.

Another solution consists in employing pulses furnished by the ignition system of the engine in order to ensure synchronization of the valve opening pulses.

The invention likewise has in view the preferred arrangements below:
a. there is one valve opening pulse per engine cycle;
b. means are provided to time the start of the valve opening with respect to the rotation of the motor shaft;
c. these means include means of variation of the position of the said timing;
d. means are provided to prevent the arrival of an opening signal at the valve so long as the latter has not dropped back onto its seat. It will be a question, for example, of an electronic gate in the pulse circuit, open only when the valve is on its seat;
e. the predetermined value of the concentration of oxygen below which opening pulses are sent to the valve is near to zero. In other words the opening of the valve is ordered as soon as there is no longer oxygen in the burnt gases or as long as there is no oxygen in the burnt gases;
f. the unit quantity of additional air furnished by each lifting of the valve is less than 15% of the unit cylinder capacity. This value preferably lies between 5 and 10% of the unit cylinder capacity;
g. the unit quantity of additional air is adjustable;
h. the device includes means putting the additional air at overpressure with respect to the pressure prevailing in the intake pipe. preferably the additional air will be at an absolute pressure of the order of 1 to 1.5 bars. This arrangement has the effect of practically eliminating variations in the flow of additional air due to load losses in the additional air inlet pipe or to the effect of engine suction. This overpressure will be obtained by any suitable means such as a pump driven electrically or by the engine or by the suction prevailing in the piping, this pump being a pump belonging to the device or else the pump provided to effect post-combustion of the exhaust gases;

i. the additional air is air at overpressure with respect to the pressure prevailing in the intake pipe, coming from a post-combustion pump which blows air into the exhaust pipe and the probe is located in the exhaust pipe upstream of the point of admission of the post-combustion air;

j. means are provided of interrupting or modifying the operation of the corrective device under certain working conditions such as tick-over, deceleration, full load and acceleration;

k. these means consist of contactors which lock the valve in the closed position, the said contactors being actuated by a member connected to the control of the acceleration of the engine or of the speed of the latter;

l. these means consist of an air inlet opening into the exhaust pipe upstream of the apparatus analyzing the burnt gases, this air inlet being controlled by a closure means subjected to the control of the acceleration of the engine so as to open during operation of the engine under any one of the said conditions;

m. means are provided for putting the device out of circuit when the engine is cold. These means will, for example, be a thermostatic device sensitive to engine temperature. They will enable enrichment of the mixture to be retained when the temperature of the contactor is less than a chosen value.

This arrangement has the effect of reducing the amount of unburnt components and of CO which the post-combustion has to eliminate, and hence of reducing the air flow necessary to the post-combustion. Further, if the post-combustion is effected by catalysis it considerably increases the longevity of the catalyst and increases the efficacy of catalysts which have properties reductive of the oxides of nitrogen.

The invention is illustrated by the attached drawing on which have been displayed in:

FIG. 1—a diagrammatic view illustrating one embodiment of the invention in the case of an engine fed by carburettor;

FIG. 2—a variant upon FIG. 1 for the case of an engine fed by injection device;

FIG. 3—an example of a valve;

FIG. 4—a partial perspective view showing the adaption of the device of the invention to an existing vehicle;

FIG. 5—a diagrammatic view similar to FIG. 1 illustrating a variant embodiment.

In FIG. 1 the internal combustion engine has been shown diagrammatically by a cylinder 1 fed from the carburettor 2 by means of the intake pipe 3; the burnt gases escape through the pipe 4; the engine shaft is indicated diagrammatically by the dotted line 5.

The corrective device in accordance with the invention comprises an auxiliary air inlet 6 tapped into the intake pipe 3 downstream of the carburettor 2, a valve 7 or the equivalent controlling the air inlet 6, a $ZrO_2$ probe located in the exhaust pipe, connected electrically to the pulse circuit 9 to which it sends a current variable as a function of the composition of the burnt gases at 8.

The pulse circuit 9 sends to the valve 7 signals which are synchronized with the engine by a device such as the pick-up 11 and suitably amplified by the circuit 10.

So long as the current transmitted by the probe 8 to the circuit 9 corresponds with a concentration of oxygen higher than the adjustment value selected, the signals from the circuit 9 are blocked and the valve 7 remains on its seat. When this concentration falls below the selected threshold value the signals from the circuit 9 reach the valve 7 which is lifted to the rhythm of rotation of the engine and introduces into the mixture a predetermined amount of additional air at each cycle.

Any excess richness of the air-petrol mixture furnished by the carburettor is thus corrected automatically.

The example in FIG. 2 differs from that in FIG. 1 as regards the proportioning member which is an injection system comprising the injection 2a, the computer 2b and a flowmeter 2c. The additional air inlet 6 is tapped into the pipe 3 downstream of the flowmeter 2c.

In either of the cases in the figures, therefore, the additional air inlet is tapped in downstream of the members determining the initial proportioning.

According to FIGS. 1 and 2 the additional air is at overpressure with respect to the pressure prevailing in the pipe 3; this is obtained by the pump 12 driven by the engine shaft 5. The overpressure will be, for example, of the order of 0.2 to 1.5 bars depending on the engine working conditions and loads.

As displayed in FIG. 1 the pump 12 can furnish post-combustion air into the exhaust pipe through the pipe 13 opening into it at 14. In this case the probe 8 is located upstream of the point 14. At 15 is represented a possible post-combustion catalyst.

The valve 7 will be executed in any suitable fashion, for example, in the form of an electromagnetic ball (or flap) valve as displayed in FIG. 3.

Depending on the cylinder capacity of the engine and the unit flow of additional air, one or a number of valves might be employed which could respectively be located on one or a number of additional air pipes.

FIG. 4 illustrates the fact that the device of the invention can be mounted on any existing vehicle. It does not involve any modifications of the carburettor 2; the probe 8 is mounted in the exhaust pipe 4 upstream of the post-combustion air inlet 14 and the catalyst if any, and is connected electrically to the electronic circuits 9, 10 which in turn are electrically connected to the valve 7 located on a branch pipe going from the pump 12 to the intake pipe 3.

In FIG. 4 for clarity in the figure the device ensuring synchronization of the valve 7 with the engine has not been shown. This device can be mounted on the shaft of the pump, for example.

It is important that no opening signal be able to reach the valve 7 before the latter has dropped back onto its seat, otherwise there would be the risk of its remaining open and it would no longer deliver air in amounts measured for each cycle. With this object an electronic gate is provided in the pulse circuit 9, which opens only when the valve is on its seat.

This arrangement, as also the details of a pulse circuit capable of delivering the opening signals when the voltage supplied by the probe 8 exceeds the value selected, are not shown in detail since they are within the domain of those skilled in the art.

It may be of interest to interpose between the probe and the threshold pulse circuit 9 an integrator 16 FIGS. 1 and 5 so as to attenuate the instantaneous variations in the voltage supplied by the probe 8 and to control the circuit 9 from a mean value.

The unit quantity of additional air furnished by each opening of the valve will be selected to ensure an average correction at all working conditions under which the carburettor 2 (or injector) furnishes too rich a mixture. In particular it is advantageous to choose a unit quantity insufficient for high speeds of the engine, so as to maintain a rich mixture under these conditions.

This unit quantity of air depends on the carburettor's 2 (or injection system's) own characteristic curve and will be adjusted in each case, for example, by adjustment of the travel or time of lift of the valve 7.

With the corrector in accordance with the invention there may be advantage in regulating the proportioning member (carburettor or injection system) so as to accentuate the range of working conditions having an excess of fuel in relation to the poor working conditions.

As the corrector of the invention acts solely by weakening the mixture its domain of intervention is thus increased by reducing the poor working conditions and a more regular average is obtained, whilst at the same time preserving certain rich working conditions (high speeds in particular).

It is likewise of interest to time the opening of the valve with respect to the engine shaft so that the opening of the valve is produced at a predetermined point in the cycle.

Similarly it is advantageous if this timing can be modified at will by a means of regulation. The means of doing this are not shown since they are themselves known and of the type of those employed for advancing or retarding the ignition. Again, the invention provides that the corrective device of the invention can be short-circuited, blocked or taken out of circuit under certain circumstances of operation of the engine and particularly:
— at high loads and at speeds of the engine and the vehicle higher than stated values,
— at tick-over with the pedal up, but not when the pedal is is raised for reasons of deceleration,
— when the engine is cold.

It is in fact necessary that the proportioning should be rich under these circumstances.

The means of effecting this putting out of circuit or this interruption of the operation of the corrective device are within the understanding of those skilled in the art. It will be a matter of one or a number of contactors which will come into action in response to information furnished by tachometers (engine speed and vehicle speed), a manometer capsule located on the intake pipe, the accelerator pedal (raised position, position hard down) or the throttling member of the carburettor (closed position, open position).

These known means have also not been shown for the same reasons.

On the other hand in FIG. 5 is displayed a solution which consists in falsifying the information received by the probe 8 by means of an air inlet opening into the exhaust pipe 4 at 18 upstream of the probe 8, this air inlet being controlled by at least one closure means which opens for operation at certain working conditions.

In the example displayed there is provided for the tick-over and violent decelerations a set of pipework 17 controlled by the solenoid valve 19 and for full load and acceleration a set of pipework 22 controlled by the solenoid valve 23.

The two sets of pipework are fed by the airpump 12 and come out at 18 upstream of the probe 8. The solenoid valves 19 and 23 are controlled by the contractors 21 and 24 which are actuated respectively under conditions of tick-over and of full load. For example, the contactor 21 closes when the accelerator pedal is raised, whilst the contactor 24 closes when the accelerator pedal is pushed right down or beyond a predetermined position.

The operation of the device is as follows.

At tick-over of violent deceleration the contactor 21 is closed and the solenoid valve 19 is opened. The pump 12 sends air to 18, upstream of the probe 8. The latter therefore artificially detects oxygen and gives the corrective device information corresponding with the case of a weak mixture, which causes enrichment of the mixture. At full load or for acceleration, the accelerator have been pushed beyond a certain position the contactor 24 closes and causes opening of the solenoid valve 23 which brings about the same consequences as in the previous case.

One can likewise provide a single solenoid valve 19 actuated by a contactor with two positions, one corresponding with the tick-over and the other with full load. But the flows necessary at tick-over and at full load are clearly different and it is preferable to provide two air inlets, each dimensioned for its proper function and controlled by a respective valve.

The arrangement as FIG. 5 enables regulation of the enrichment of the mixture at certain speeds, which is much more flexible than the solution consisting of blocking the solenoid valve 7 in the closed position under these conditions. In fact one can thus not absolutely interrupt the additional air inlet but reduce it in controllable proportions and adapt this reduction to the different working conditions by the fact of the employment of the pressure of the pump, which is a function of the engine speed.

In FIG. 5 it can likewise be seen that:
a. Synchronization with the engine of pulses sent to the solenoid valve 7 can be obtained by controlling these pulses from the ignition device 26 of the engine,
b. the additional air inlet preferably opens directly onto the center of the intake pipe's cross section. This arrangement in fact considerably increases the efficacy of the device which depends not only on the proportioning but on the homogeneity of the mixture.

In the case of application of the invention to stratified charge engines, that is to say, in which each cylinder is fed by means of two different mixtures, one rich, the other weak, entering the cylinder through two intake pipes, the additional air inlet in accordance with the invention will preferably open into the weak mixture intake pipe.

What we claim is:
1. A device for correcting the proportioning of the air-petrol mixture furnished by a proportioning member to an internal combustion engine having an intake pipe connected from the proportioning member and an exhaust pipe for burnt gases, the device comprising at least one auxiliary air inlet tapped into said intake pipe downstream of the member determining the proportioning of the air-petrol mixture, means for providing auxiliary air to said at least one auxiliary air inlet at overpressure with respect to the pressure prevailing in the intake pipe, at least one valve controlling the air inlet or inlets, a probe arranged in the exhaust pipe for delivering an electric signal which is a function of the composition of the burnt gases, and electronic means releasing electrical pulses controlling the opening of the valve or valves in synchronism with the engine so as to introduce into the mixture a quantity of air predetermined at each cycle of the engine in response to the information from the probe which the concentration of oxygen in the burnt gases is lower than a predetermined value (or the concentration of CO is higher than a predetermined value).

2. A device as claimed in claim 1 in which said electronic means prevents the arrival of an opening signal at the valve as long as the latter has not dropped back on its seat.

3. A device as claimed in claim 1 in which said electronic means provides opening pulses to said valve when the concentration of oxygen is lower than a predetermined value of near to zero.

4. A device as claimed in claim 1 in which the additional air is at an absolute pressure of 1 to 1.5 bars.

5. A device as claimed in claim 1 in which the additional air inlet into the intake pipe opens directly onto the center of said pipe's cross section.

6. A device as claimed in claim 1 in which said valve furnishes a unit quantity of additional air at each lifting of said valve that is less than 15% of the unit cylinder capacity of the internal combustion engine.

7. A device as claimed in claim 6 in which said valve furnishes a unit quantity of additional air at each lifting of said valve that is between 5 and 10% of the unit cylinder capacity of the internal combustion engine.

* * * * *